United States Patent
Martinez et al.

(10) Patent No.: US 9,841,086 B1
(45) Date of Patent: Dec. 12, 2017

(54) TENSIONER

(71) Applicant: GATES CORPORATION, Denver, CO (US)

(72) Inventors: Arnaud Martinez, Aachen (DE); Enrico Wick, Stolberg (DE); Volker Leucht, Eschweiler (DE)

(73) Assignee: GATES CORPORATION, Denver, CO (US)

( * ) Notice: Subject to any disclaimer, the term of this patent is extended or adjusted under 35 U.S.C. 154(b) by 0 days.

(21) Appl. No.: 15/266,114

(22) Filed: Sep. 15, 2016

(51) Int. Cl.
*F16H 7/12* (2006.01)
*F16H 7/08* (2006.01)

(52) U.S. Cl.
CPC ......... *F16H 7/1218* (2013.01); *F16H 7/0831* (2013.01); *F16H 2007/081* (2013.01); *F16H 2007/0865* (2013.01); *F16H 2007/0893* (2013.01)

(58) Field of Classification Search
CPC ............. F16H 2007/081; F16H 7/1218; F16H 7/1281; F16H 2007/0893; F16H 2007/0874
USPC .................................................. 474/135, 134
See application file for complete search history.

(56) References Cited

U.S. PATENT DOCUMENTS

| | | | | |
|---|---|---|---|---|
| 4,069,719 A | * | 1/1978 | Cancilla | B62M 9/16 474/134 |
| 4,472,162 A | * | 9/1984 | Hitchcock | F16H 7/1218 474/117 |
| 4,698,049 A | * | 10/1987 | Bytzek | F16H 7/1218 384/271 |
| 4,971,589 A | * | 11/1990 | Sidwell | F16H 7/1218 474/117 |
| 5,057,059 A | * | 10/1991 | Sidwell | F16H 7/1218 474/135 |
| 5,149,306 A | * | 9/1992 | Sidwell | F16H 7/1218 474/117 |
| 5,250,009 A | * | 10/1993 | Sidwell | F16H 7/1218 474/117 |
| 5,443,424 A | * | 8/1995 | Henderson | F16H 7/1218 474/135 |
| 5,545,095 A | * | 8/1996 | Henderson | F16H 7/1218 474/135 |
| 5,620,385 A | * | 4/1997 | Cascionale | F16H 7/1218 474/112 |
| 5,772,549 A | * | 6/1998 | Berndt | F16H 7/1281 474/135 |

(Continued)

*Primary Examiner* — Henry Liu
(74) *Attorney, Agent, or Firm* — Jeffrey A. Thurnau, Esq.; Paul N. Dunlap, Esq.

(57) ABSTRACT

A tensioner comprising a first pivot arm having a first pulley journalled thereto, a second pivot arm having a second pulley journalled thereto, a frustoconical base having a base vertex, a frustoconical pivot shaft having a pivot shaft vertex, the base vertex is oriented opposite the pivot shaft vertex on a common axis, the first pivot arm disposed for pivoting movement about the frustoconical pivot shaft, the second pivot arm disposed for pivoting movement about the frustoconical base, a first bushing damping movement of the first pivot arm on the frustoconical pivot shaft, a second bushing damping movement of the second pivot arm on the frustoconical base, and a spring in compression urging engagement of the first pivot arm with the frustoconical pivot shaft and the second pivot arm with the frustoconical base.

5 Claims, 3 Drawing Sheets

(56) References Cited

U.S. PATENT DOCUMENTS

| | | | | |
|---|---|---|---|---|
| 5,795,257 A * | 8/1998 | Giese | F16H 7/1218 | 474/109 |
| 6,575,860 B2 * | 6/2003 | Dutil | F16H 7/1218 | 474/135 |
| 6,648,783 B1 * | 11/2003 | Bogner | F16H 7/1281 | 474/134 |
| 6,652,401 B2 * | 11/2003 | Liu | F16H 7/1209 | 474/134 |
| 6,689,001 B2 * | 2/2004 | Oliver | F16H 7/1281 | 474/109 |
| 7,468,013 B2 * | 12/2008 | Di Giacomo | F16H 7/1281 | 474/117 |
| 7,497,794 B2 * | 3/2009 | Lannutti | F16H 7/1218 | 474/133 |
| 7,819,765 B2 * | 10/2010 | Kawahara | F16H 7/1218 | 474/135 |
| 7,901,310 B2 * | 3/2011 | Lolli | F16H 7/1281 | 474/101 |
| 8,002,657 B2 * | 8/2011 | Antchak | F16H 7/1218 | 474/101 |
| 8,038,555 B2 * | 10/2011 | Pendergrass | F16H 7/1218 | 188/82.4 |
| 8,142,315 B2 * | 3/2012 | Dell | F16H 7/1218 | 474/135 |
| 8,353,795 B2 * | 1/2013 | Montani | F16H 7/1281 | 474/118 |
| 8,562,466 B2 * | 10/2013 | Mevissen | F16H 7/1218 | 474/112 |
| 8,684,872 B2 * | 4/2014 | Mevissen | F16H 7/1218 | 474/135 |
| 8,888,627 B2 * | 11/2014 | Crist | F16H 7/1218 | 474/133 |
| 8,932,163 B2 * | 1/2015 | Fittro | F16H 7/1281 | 474/135 |
| 9,341,243 B2 * | 5/2016 | Replete | F16H 7/1218 | |
| 2002/0039944 A1 * | 4/2002 | Ali | F16H 7/1209 | 474/135 |
| 2002/0086751 A1 * | 7/2002 | Bogner | F02B 63/04 | 474/134 |
| 2002/0119850 A1 * | 8/2002 | Dutil | F16H 7/1218 | 474/135 |
| 2003/0069098 A1 * | 4/2003 | Serkh | F16H 7/1218 | 474/135 |
| 2003/0109342 A1 * | 6/2003 | Oliver | F16H 7/1281 | 474/134 |
| 2003/0216203 A1 * | 11/2003 | Oliver | F16H 7/1281 | 474/134 |
| 2004/0043854 A1 * | 3/2004 | Fraley, Jr. | B62D 5/0424 | 474/134 |
| 2005/0043130 A1 * | 2/2005 | Hao | F16H 7/1218 | 474/135 |
| 2006/0100049 A1 * | 5/2006 | Lannutti | F16H 7/1218 | 474/133 |
| 2006/0217222 A1 * | 9/2006 | Lolli | F16H 7/1281 | 474/134 |
| 2007/0037648 A1 * | 2/2007 | Di Giacomo | F16H 7/1281 | 474/134 |
| 2008/0119311 A1 * | 5/2008 | Wilhelm | F16H 7/1218 | 474/135 |
| 2008/0194366 A1 * | 8/2008 | Mevissen | F16H 7/1218 | 474/135 |
| 2008/0214342 A1 * | 9/2008 | Montani | F16H 7/1218 | 474/134 |
| 2008/0220919 A1 * | 9/2008 | Antchak | F16H 7/1218 | 474/135 |
| 2009/0275432 A1 * | 11/2009 | Dell | F16H 7/1218 | 474/135 |
| 2010/0137084 A1 * | 6/2010 | Mevissen | F16H 7/1218 | 474/135 |
| 2011/0294615 A1 * | 12/2011 | Crist | F16H 7/1218 | 474/135 |
| 2012/0004059 A1 * | 1/2012 | Ma | F16H 7/1218 | 474/135 |
| 2012/0115657 A1 * | 5/2012 | Antchak | F16H 7/1218 | 474/135 |
| 2013/0217526 A1 * | 8/2013 | Fittro | F16H 7/1281 | 474/135 |
| 2013/0260932 A1 * | 10/2013 | Adam | F16H 7/1218 | 474/134 |
| 2013/0260933 A1 * | 10/2013 | Dutil | F16H 7/1218 | 474/135 |
| 2014/0274511 A1 * | 9/2014 | Lannutti | F16H 7/1218 | 474/135 |
| 2015/0051033 A1 * | 2/2015 | Replete | F16H 7/1218 | 474/117 |
| 2015/0247557 A1 * | 9/2015 | Lindstrom | F16H 7/12 | 474/135 |
| 2016/0273622 A1 * | 9/2016 | Kim | F02N 11/00 | |

* cited by examiner

TENSIONER

FIELD OF THE INVENTION

The invention relates to a tensioner, and more particularly, to a tensioner having a pivot shaft having two facing frustoconical portions disposed on a common axis, each of the first pivot arm and second pivot engaged with a respective facing frustoconical portion.

BACKGROUND OF THE INVENTION

Most engines used for automobiles and the like include a number of belt driven accessory systems which are necessary for the proper operation of the vehicle. The accessory systems may include an alternator, air conditioner compressor and a power steering pump.

The accessory systems are generally mounted on a front surface of the engine. Each accessory has a pulley mounted on a shaft for receiving power from some form of belt drive. In early systems, each accessory was driven by a separate belt that ran between the accessory and the crankshaft. Due to improvements in belt technology, single serpentine belts are now generally used in most applications. A single serpentine belt routed among the various accessory components drives the accessories. The engine crankshaft drives the serpentine belt.

Since the serpentine belt must be routed to all accessories, it has generally become longer than its predecessors. To operate properly, the belt is installed with a pre-determined tension. As it operates, it stretches slightly over its length. This results in a decrease in belt tension, which may cause the belt to slip. Consequently, a belt tensioner is used to maintain the proper belt tension as the belt stretches during use.

A current trend of automobile manufacturers is to replace the traditional starting motor and generator with a single reversible starter-generator, which is connected to the crankshaft by means of a drive belt. During the start step, the starter-generator functions as a motor and drives the crankshaft of the internal-combustion engine; when the vehicle is in motion, instead, the starter-generator is driven by the internal-combustion engine and generates electric current for recharging the battery and running the auxiliary systems.

In the case where a starter-generator is used, the belt spans will have differing tensions according to the mode of operation. The span that is tight during the starting phase, in which the starter-generator is the driving member and the internal-combustion engine is the driven member, becomes slack in the stage of normal running, in which the internal-combustion engine is the driving member and the starter-generator is the driven member.

To overcome this problem bi-directional belt tensioners or two-arm belt tensioners, i.e., which comprise two arms provided with pulleys, each acting on a respective span of the belt are known. The two arms can be mounted on the same pivot point in order to pivot about a common axis. The arms are loaded in the direction of one another by a spring so that the respective pulleys will co-operate with respective spans of the belt, thereby ensuring their proper tension.

Representative of the art is US 2002/0039944 which discloses an improved belt tensioner for a belt drive system having a belt tensioner, a crankshaft pulley, an accessory pulley, and a motor/generator pulley. The belt drive system further includes a power transmission belt trained about the crankshaft pulley, the accessory pulley, and the motor/generator pulley. The belt tensioner is of the type including an attachment point adapted to be affixed to a stationary point relative to a cylinder block of an engine, a first belt tensioner pulley, a biasing member, and a connective portion adapted to communicate a force from the biasing member to the power transmission belt via the first belt tensioner pulley. It is improved by the belt tensioner including a second tensioner pulley, and the connective portion being adapted to communicate the force from the biasing member to the first tensioner pulley and to the second tensioner pulley and thereby mutually asymmetrically biasing the first tensioner pulley and the second tensioner pulley toward movement tending to increase tension upon the power transmission belt.

What is needed is a tensioner having a pivot shaft having two facing frustoconical portions disposed on a common axis, each of the first pivot arm and second pivot engaged with a respective facing frustoconical portion. The present invention meets this need.

SUMMARY OF THE INVENTION

The primary aspect of the invention is to provide a tensioner having a pivot shaft having two facing frustoconical portions disposed on a common axis, each of the first pivot arm and second pivot engaged with a respective facing frustoconical portion.

Other aspects of the invention will be pointed out or made obvious by the following description of the invention and the accompanying drawings.

The invention comprises a tensioner comprising a first pivot arm having a first pulley journalled thereto, a second pivot arm having a second pulley journalled thereto, a frustoconical base having a base vertex, a frustoconical pivot shaft having a pivot shaft vertex, the base vertex is oriented opposite the pivot shaft vertex on a common axis, the first pivot arm disposed for pivoting movement about the frustoconical pivot shaft, the second pivot arm disposed for pivoting movement about the frustoconical base, a first bushing damping movement of the first pivot arm on the frustoconical pivot shaft, a second bushing damping movement of the second pivot arm on the frustoconical base, and a spring in compression urging engagement of the first pivot arm with the frustoconical pivot shaft and the second pivot arm with the frustoconical base.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
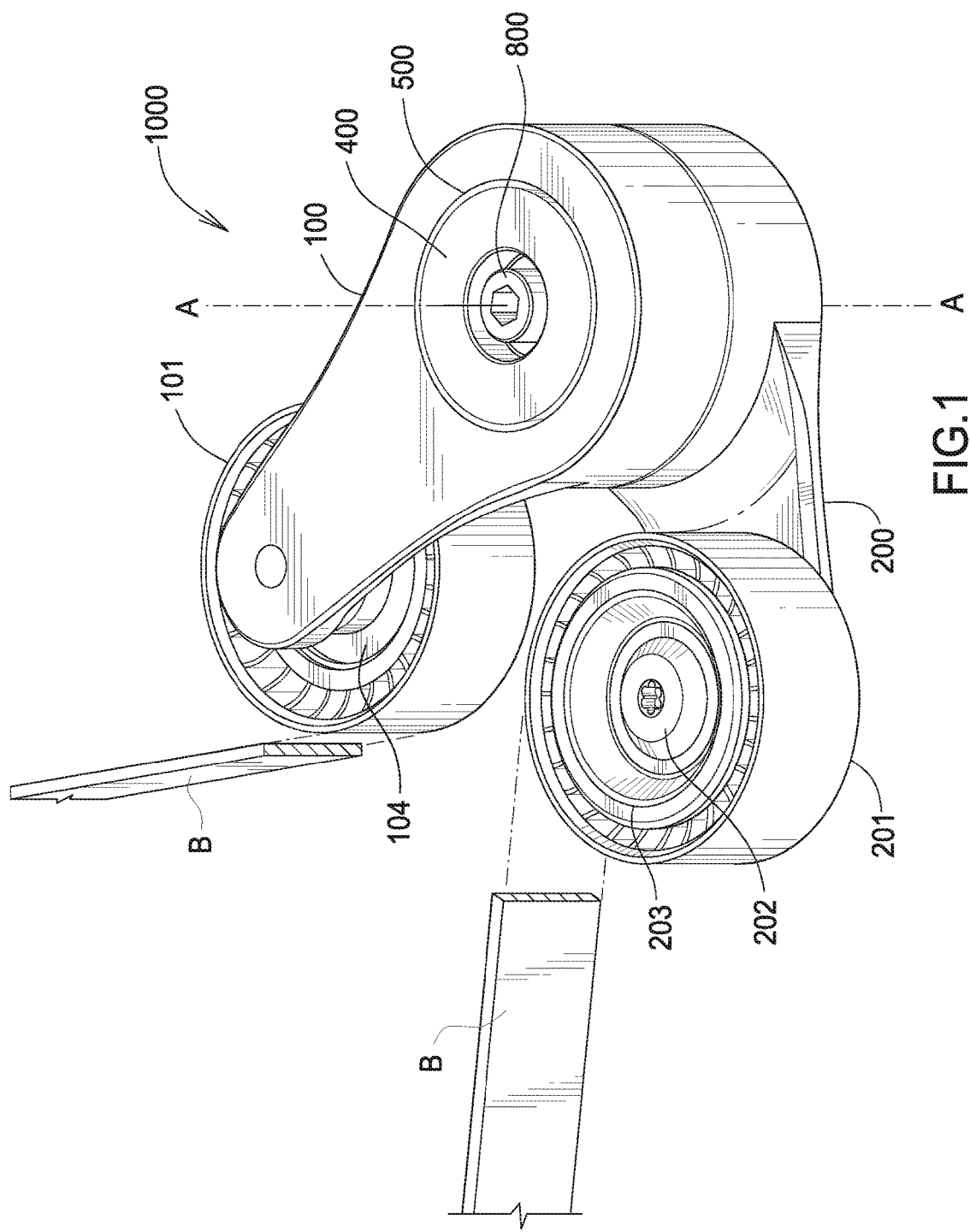
FIG. 1 is a perspective view.

FIG. 1 is a perspective view. Tensioner 1000 comprises a first pivot arm 100 and a second pivot arm 200. Pulley 101 is journalled to pivot arm 100. Pulley 201 is journalled to pivot arm 200. Pivot arm 100 and pivot arm 200 independently pivot about a common axis A-A. In operation the pivot arms are biased toward each other in a scissor like manner by a torsion spring.

Figure 2:
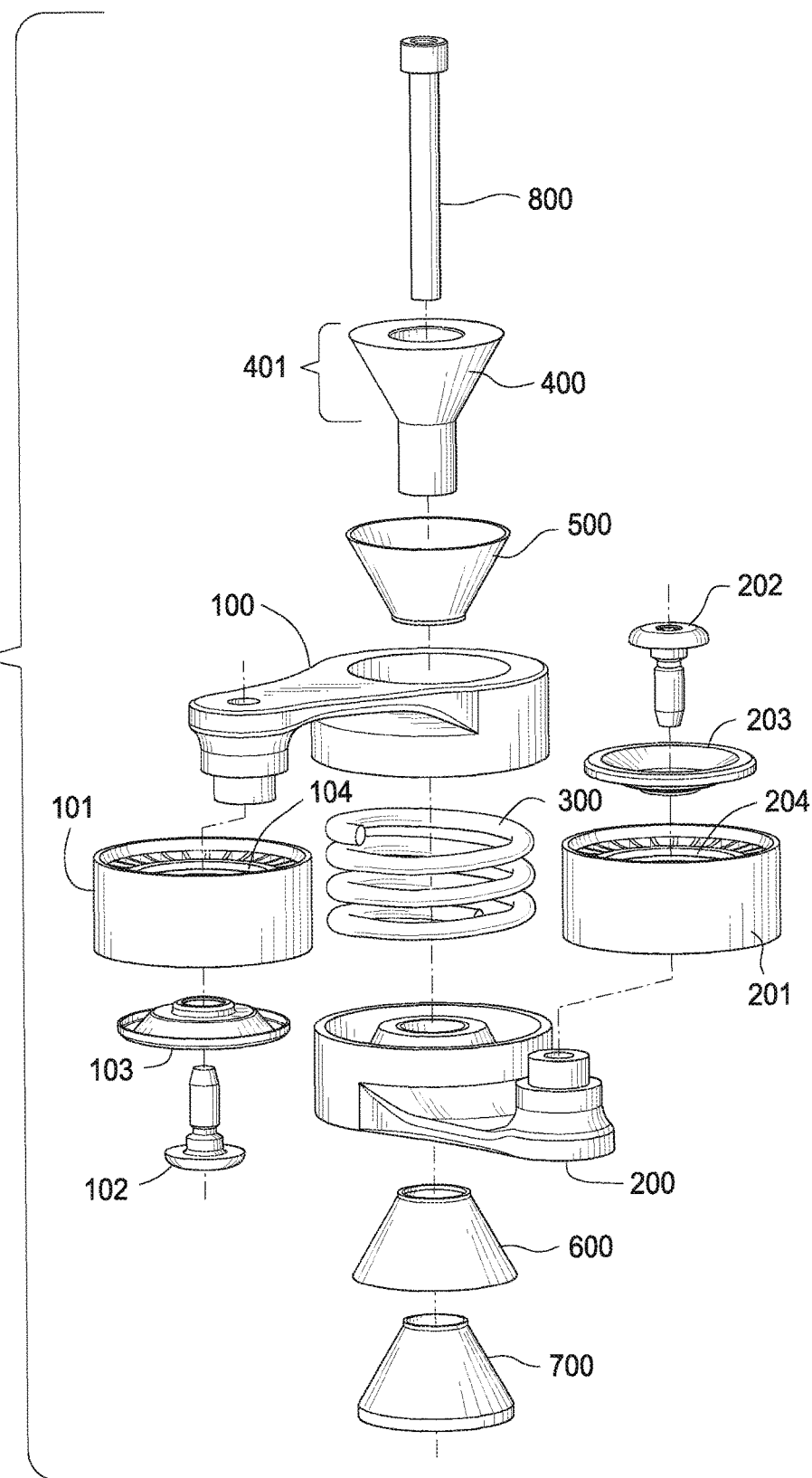
FIG. 2 is an exploded view.

FIG. 2 is an exploded view. Fastener 800 extends through pivot shaft 400 and base 700 to attach the tensioner to a mounting surface. Bushing 500 is disposed between pivot shaft 400 and pivot arm 100. Bushing 600 is disposed between base 700 and pivot arm 200. Pivot arm 100 and pivot arm 200 pivot about pivot shaft 400 which is aligned with axis A-A. Spring 300 torsionally bias pivot arm 100 and pivot arm 200 such that a load is imposed upon a belt (B) engaged with each pulley 101 and 201.

Bushing 500 and bushing 600 are each frustoconical in shape. A frustoconical portion 401 of pivot arm 400 cooperatively engages bushing 500. Base 700 has a frustoconical shape which cooperatively engages bushing 600. Portion 401 describes a vertex angle α. Base 700 describes a vertex angle β. Vertex angle α and vertex angle β may be adjusted by a user. They may be equivalent or not depending upon design requirements. They are each typically in the range of about 30 degrees to about 120 degrees. The numbers are offered as examples and are not intended to limit the scope of the invention.

The vertex of bushing 500 points opposite the vertex of bushing 600. The vertex 402 of portion 401 points opposite the vertex 702 of base 700. This orientation captures pivot arm 100 and pivot arm 200 between portion 401 and base 700.

Fastener 102 retains pulley 101 on pivot arm 100. Fastener 202 retains pulley 201 on pivot arm 200. Dust shield 103 prevents debris from contaminating pulley bearing 104. Dust shield 203 prevents debris from contaminating pulley bearing 204.

Figure 3:
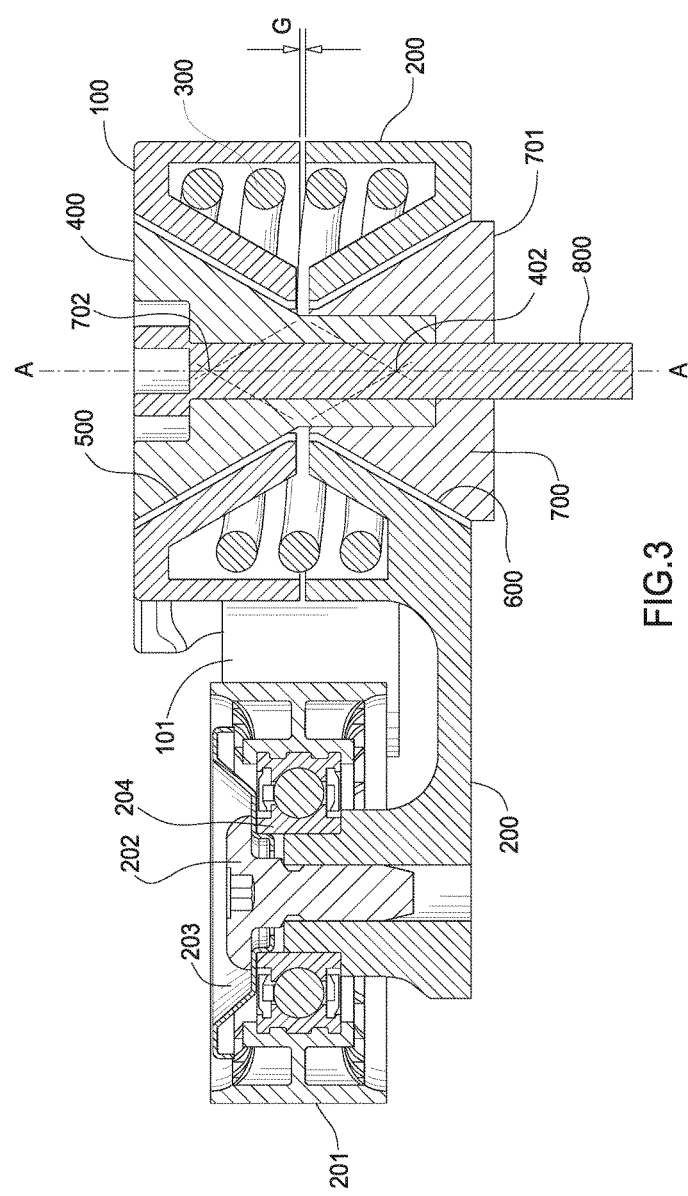
FIG. 3 is a cross-section view.

FIG. 3 is a cross-section view. Pivot shaft 400 cooperatively engages base 700. Base vertex 702 points opposite pivot shaft vertex 402.

Pivot arm 100 and pivot arm 200 are pinched between pivot shaft frustoconical portion 401 and frustoconical base 700. Torsion spring 300 exerts an axial spring force on the first pivot arm and the second pivot arm, thereby urging pivot arm 100 into pivot shaft portion 401 and pivot arm 200 into base 700.

Bushing 500 and bushing 600 each act to damp movements of the respective pivot arm 100 and 200. The frictional force is created by the axial force exerted by spring 300 on each pivot arm. Spring 300 is in axial compression between pivot arm 100 and pivot arm 200. The frictional force is a function of the spring force developed by the axial compression of the spring.

Surface 701 of base 700 engages a mounting surface, such as an engine (not shown). Fastener 800 fixes the tensioner to the mounting surface.

In operation pivot arm 100 moves independently of pivot arm 200. A small gap "G" between the pivot arms allows independent movement of the pivot arms. Portion 401 and base 700 combined may also comprise a pivot shaft with facing frustoconical sections on a common axis A-A, between which pivot arms 100, 200 are captured. The facing frustoconical shapes of portion 401 and base 700 allow ease of orientation such that the independent pivot arm motion is possible in a compact tensioner package. The frustoconical shape of the pivot shaft and base each provide an automatic means of alignment of the pivot arms during operation. The alignment is maintained as the bushings wear.

A tensioner comprising a first pivot arm having a first pulley journalled thereto, a second pivot arm having a second pulley journalled thereto, a frustoconical base having a base vertex, a frustoconical pivot shaft having a pivot shaft vertex, the base vertex is oriented opposite the pivot shaft vertex on a common axis, the first pivot arm disposed for pivoting movement about the frustoconical pivot shaft, the second pivot arm disposed for pivoting movement about the frustoconical base, a first bushing damping movement of the first pivot arm on the frustoconical pivot shaft, a second bushing damping movement of the second pivot arm on the frustoconical base, and a spring in compression urging engagement of the first pivot arm with the frustoconical pivot shaft and the second pivot arm with the frustoconical base.

A tensioner comprising a first pivot arm having a first pulley journalled thereto, a second pivot arm having a second pulley journalled thereto, the first pivot arm and second pivot arm captured between opposing frustoconical surfaces, and a torsional spring in compression between the first pivot arm the second pivot arm.

A tensioner comprising a first pivot arm having a first pulley journalled thereto, a second pivot arm having a second pulley journalled thereto, a pivot shaft having two facing frustoconical portions disposed on a common axis, each of the first pivot arm and second pivot arm engage with a respective facing frustoconical portion, and a torsion spring in axial compression between the first pivot arm and the second pivot arm, the torsion spring urging the first pivot arm and the second pivot arm toward each other.

Although a form of the invention has been described herein, it will be obvious to those skilled in the art that variations may be made in the construction and relation of parts and method without departing from the spirit and scope of the invention described herein.

We claim:

1. A tensioner comprising:
   a first pivot arm (100) having a first pulley (101) journalled thereto;
   a second pivot arm (200) having a second pulley (201) journalled thereto;
   a frustoconical base (700) having a base vertex (702);
   a frustoconical pivot shaft (400) having a pivot shaft vertex (402);
   the base vertex is oriented opposite the pivot shaft vertex on a common axis (A-A);
   the first pivot arm disposed for pivoting movement about the frustoconical pivot shaft, the second pivot arm disposed for pivoting movement about the frustoconical base;
   a first bushing (500) damping movement of the first pivot arm on the frustoconical pivot shaft;
   a second bushing (600) damping movement of the second pivot arm on the frustoconical base; and
   a spring (300) in compression urging engagement of the first pivot arm with the frustoconical pivot shaft and the second pivot arm with the frustoconical base.

2. A tensioner comprising:
   a first pivot arm having a first pulley journalled thereto;
   a second pivot arm having a second pulley journalled thereto;
   the first pivot arm and second pivot arm captured between opposing frustoconical surfaces; and
   a torsional spring in compression between the first pivot arm and the second pivot arm.

3. A tensioner comprising:
   a first pivot arm having a first pulley journalled thereto;
   a second pivot arm having a second pulley journalled thereto;
   a pivot shaft having two facing frustoconical portions disposed on a common axis, each of the first pivot arm and second pivot arm engage with a respective facing frustoconical portion; and a torsion spring in axial compression between the first pivot arm and the second pivot arm, the torsion spring urging the first pivot arm and the second pivot arm toward each other.

4. The tensioner as in claim 3 further comprising a frictional bushing between the first pivot arm and one of the facing frustoconical portions.

5. The tensioner as in claim 4 further comprising a frictional bushing between the second pivot arm and the other facing frustoconical portion.

* * * * *